United States Patent [19]

Mayer et al.

[11] Patent Number: 5,396,633
[45] Date of Patent: Mar. 7, 1995

[54] POSITIVE PULSE FORMAT NOISE-FILTER AND NEGATIVE PULSE FORMAT EXTENSION CIRCUIT FOR CONDITIONING INTERRUPT REQUEST SIGNALS

[75] Inventors: Dale J. Mayer, Houston; John A. Landry, Tomball, both of Tex.

[73] Assignee: Compaq Computer Corporation, Houston, Tex.

[21] Appl. No.: 955,650

[22] Filed: Oct. 2, 1992

[51] Int. Cl.6 .................. G06F 13/24; G06F 9/46
[52] U.S. Cl. ..................... 395/725; 364/941; 364/926.9; 364/947; 364/947.2; 364/942; 364/942.06; 364/DIG. 2
[58] Field of Search ............ 395/725, 575, 550, 775, 395/425, 325; 364/724.01; 358/167; 381/106; 333/167; 328/167

[56] References Cited

U.S. PATENT DOCUMENTS

| | | | |
|---|---|---|---|
| 4,038,539 | 7/1977 | Van Cleave | 364/724.19 |
| 4,132,954 | 1/1979 | Sidhu | 328/165 |
| 4,375,084 | 2/1983 | Urushibata | 377/55 |
| 4,868,742 | 9/1989 | Gant et al. | 395/325 |
| 5,179,704 | 1/1993 | Jibbe et al. | 395/725 |
| 5,182,803 | 1/1993 | Rodi et al. | 395/575 |

FOREIGN PATENT DOCUMENTS 0199221 10/1986 European Pat. Off. ..... G06F 13/24
0347082 12/1989 European Pat. Off. ..... G06F 13/00

OTHER PUBLICATIONS

Pal Code for Compaq Computer Corp. Ultima II Processor Board for Systempro Computers, Mar. 20, 1990.

Primary Examiner—Gopal C. Ray
Attorney, Agent, or Firm—Pravel, Hewitt, Kimball & Krieger

[57] ABSTRACT

A computer system includes a filter at an interrupt request input for a microprocessor system. The interrupt signal filter suppresses any positive pulse that is shorter than 9 cycles of the host clock. Only signals that are asserted for at least 17 HCLK cycles are guaranteed passage to the interrupt controller to assert the interrupt request. In addition, any negative pulse on the IRQ signal is latched and extended for at least 9 cycles of the host clock. The filter thus suppresses noise to prevent unnecessary interrupts, and provides for enhanced detection of negative levels and rising edges for negative-going interrupt request signals.

6 Claims, 4 Drawing Sheets

POSITIVE PULSE FORMAT NOISE-FILTER AND NEGATIVE PULSE FORMAT EXTENSION CIRCUIT FOR CONDITIONING INTERRUPT REQUEST SIGNALS

BACKGROUND OF THE INVENTION

1. Field of the Invention

The invention relates to interrupt systems in computers, and more particularly, to filters for removing noise from interrupt request signals and extending signals to assure proper interrupt operation.

2. Description of the Related Art

Modern computer systems often employ a wide array of peripheral components and I/O devices. The added components provide the computer system with versatility and capability that tremendously enhance the computers performance and effectiveness. Current devices include devices like printers, communication ports, scanners, plotters, and hard drives.

Each of these I/O devices must communicate with the computer system through an I/O interface. Each peripheral component preferably generates interrupt requests to the microprocessor to demand the microprocessor's attention for particular tasks. If the devices could not interrupt the microprocessor, the computer system would have to poll the status of each I/O device at specific intervals to determine whether each device had developed a need for the microprocessor's attention. In most cases, the status check is unnecessary, resulting in wasted time. Using the interrupt system, however, the microprocessor spends no time checking the I/O device's status until an interrupt request is asserted, demanding the microprocessor's attention.

Interrupt requests are generated by the I/O devices and are provided to the computer system through the I/O interface. Each time an interrupt is asserted and recognized, the microprocessor pauses its current operations and executes an interrupt routine to service the I/O device's needs. When the interrupt routine is complete, the microprocessor returns to its original task until the next interrupt is recognized.

Although I/O devices may generate the interrupt signals to service their needs, interrupt request signals may also be generated inadvertently by noise in the environment. Normally low, positive edge triggered signals in TTL environments are particularly susceptible to noise interference. Each time the interrupt signal is asserted and recognized by the microprocessor, the microprocessor must pause its current operations and execute the interrupt routine. If the interrupt signal is generated by noise, the I/O device does not require service, and the execution of the interrupt routine serves no purpose. The microprocessor must then finish the interrupt routine and return to its original task. Each time an interrupt signal is inadvertently asserted and recognized by the system, the microprocessor wastes valuable time and suffers a reduction in efficiency.

Furthermore, some interrupt signals are normally maintained at a logic level high. To assert the interrupt, a negative pulse is asserted at the interrupt input. For many interrupt signals, the interrupt is activated by the rising edge of the negative pulse. Others are level-sensitive logic low signals. If the negative pulse is too short, however, the low logic level of the interrupt signal may not be detected by the computer system, and thus the rising edge, or the low level, of the signal is not detected. Consequently, the interrupt request is not serviced and the I/O device does not receive the necessary assistance from the microprocessor.

SUMMARY OF THE PRESENT INVENTION

A computer system according to the present invention includes a filter in the interrupt system. The interrupt signal filter suppresses noise in the interrupt request signal by suppressing any positive pulse on the interrupt request that is shorter than 9 cycles of the host clock or HCLK signal. Only signals asserted positive for at least 17 HCLK cycles are guaranteed transmission to the interrupt controller. Thus, in order to generate a valid interrupt request, the I/O device must assert a positive pulse on the interrupt request line for at least 17 cycles of the HCLK. Because noise on the interrupt request is unlikely to remain positive for more than a few cycles of the HCLK signal, this type of noise on the interrupt request signal is suppressed and is not provided to the microprocessor. Actual signals, however, generally remain asserted until acknowledged, and the 17 HCLK cycles required by the filter is easily maintained. Consequently, the microprocessor is not unnecessarily interrupted and the system efficiency is maintained.

In addition, negative pulses are detected by the filter and maintained for an extended duration. Any negative pulse on the IRQ signal is latched and extended for at least 9 cycles of the HCLK. Thus, when the I/O device requests an interrupt signal by asserting a short negative pulse, the negative pulse is extended to allow the system to recognize the logic low level, detect the rising edge of the negative pulse, and recognize the interrupt request.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
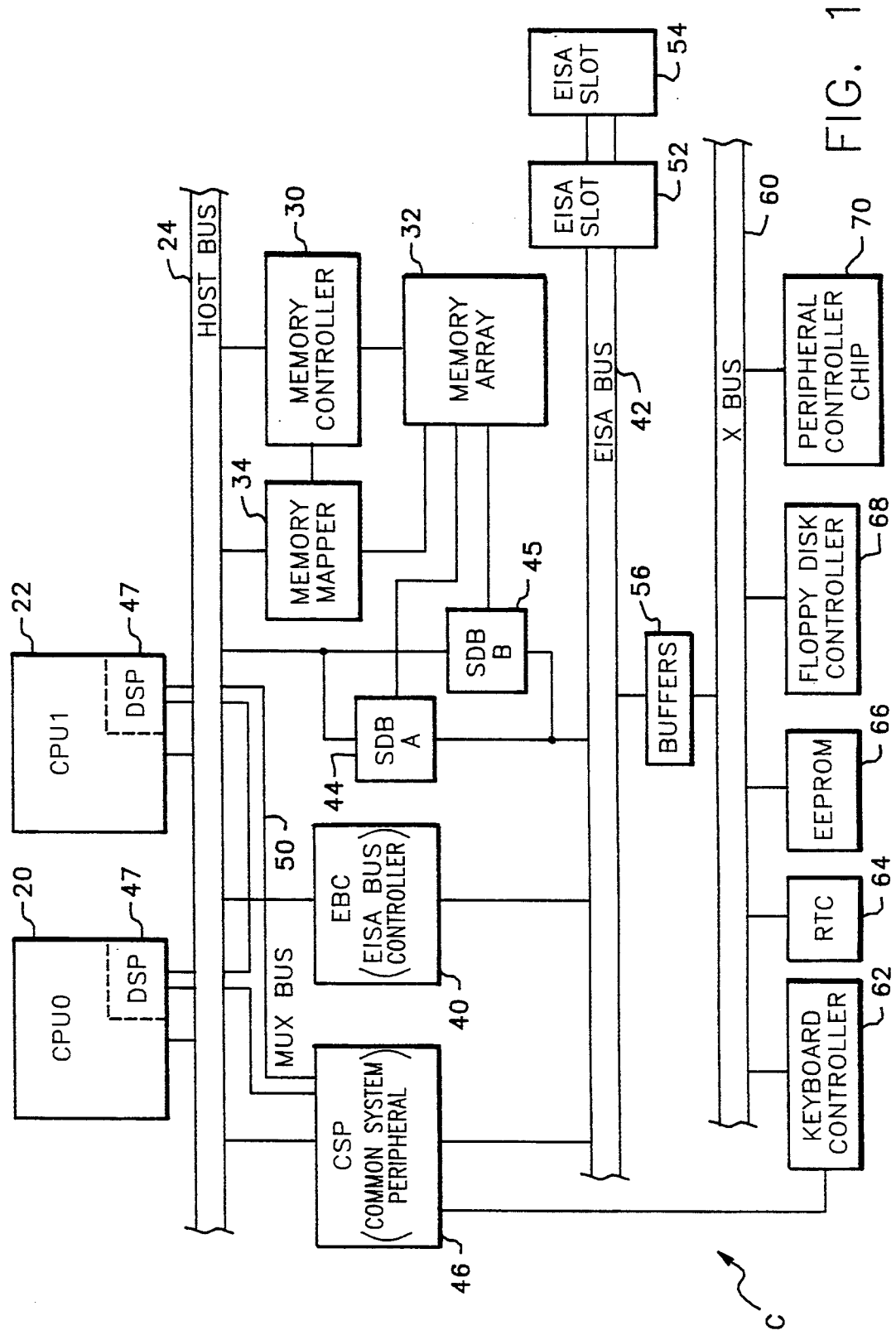
FIG. 1 is a block diagram of a computer system incorporating the present invention.

Referring now to FIG. 1, a computer system C is shown. The computer system C includes two CPU boards 20, 22 connected to a host bus 24 and a memory controller 30, which is also coupled to the host bus 24. Although two CPUs 20, 22 are used in the preferred computer system C, the present system functions for any single or multiple microprocessor system.

A main memory array 32, preferably comprised of dynamic random access memory (DRAM) modules, is coupled to the memory controller 30. Memory mapper logic 34 is coupled to the host bus 24, the memory controller 30, and the memory array 32. The memory mapper logic 34 provides memory mapping functions to facilitate memory accesses to the memory array 32.

A bus controller 40, preferably an EISA bus controller (EBC), is coupled between the host bus 24 and an expansion bus 42, preferably an Extended Industry Standard Architecture (EISA) bus. The EBC 40 provides various bus cycle translation and conversion functions to facilitate transfers between the host bus 24 and the EISA bus 42. A pair of system data buffers (SDB) 44, 45 are also coupled between the host bus 24, the memory array 32 and the EISA bus 42. A logic block referred to as the common system peripheral (CSP) 46 is coupled between the host bus 24 and the EISA bus 42. The CSP 46 is also coupled through a MUX bus 50 to logic blocks referred to as distributed system peripherals (DSPs) 126 in each of the CPUs 20, 22. The CSP 46 includes various system components including a direct memory access (DMA) controller, an EISA arbitration controller, and numerous system board logic functions like memory refresh control and interrupt logic. As described more fully below, the CSP 46 monitors several signals of the computer system C and broadcasts these signals to the DSPs 47 on the MUX bus 50, where the DSPs 47 latch these signals into corresponding local registers. The CPUs 20, 22 and other system devices access functions within the CSP 46 and registers in the other CPU's DSP 47 by executing cycles to the EISA bus 42. The DSPs 47 include an interrupt controller, a timer section, some DMA related items and other individual processor related items.

The EISA bus 42 includes a plurality of EISA slots 52 and 54 for receiving EISA expansion cards, like a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, an electrically erasable programmable read only memory (EEPROM) 66, a floppy disk controller 68, and a peripheral controller chip 70, which includes numerous ports and UARTs (universally asynchronous receiver/transmitters).

The MUX bus 50 between the CSP 46 and the various DSPs 47 associated with the CPUs 20, 22 includes an XAD bus. The XAD bus is an 8-bit bi-directional data bus on which interrupt, I/O, and special cycle data is transferred. The MUX bus 50 further includes a cycle status bus called the XST bus. This three-bit bus is controlled by the CSP 46 and defines the cycle currently being transferred on the 8-bit MUX bus 50. The MUX bus 50 further includes a two-bit XBP bus, which is a bus on which DMA byte pointer information is received from the DSPs 47. Using the XAD, XST, and XBP buses, the CSP 46 interfaces with the DSPs 47 to provide interaction between the general computer system C and the CPUs 20, 22. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference. For more information regarding the CSP 46 and the DSPs 47, please see related copending application Ser. No. 07/955,683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, also filed concurrently with this application, which is hereby incorporated by reference.

Figure 2:
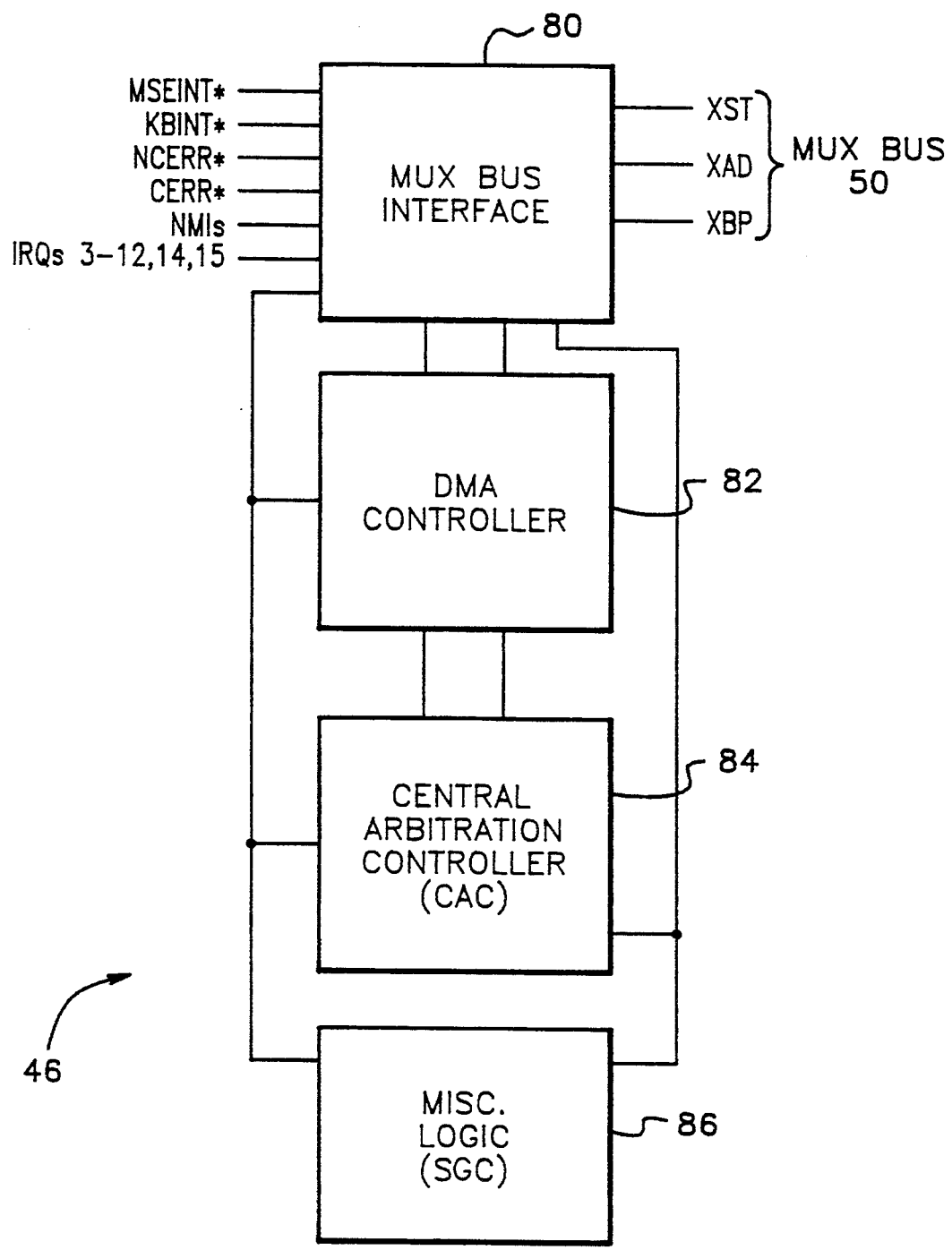
FIG. 2 is a block diagram of the common system peripheral (CSP) of FIG. 1.

Referring now to FIG. 2, a block diagram of the CSP 46 is shown. The CSP 46 includes various system functions including a MUX bus interface 80 coupled to the MUX bus 50, a direct memory access (DMA) controller 82 including a refresh controller, an EISA or central arbitration controller (CAC) 84, and other miscellaneous system board logic functions, which are generally referred to as the SGC 86.

The DMA controller 82 in the CSP 46 transfers data between the memory 32 and various I/O devices without using a main processor 20, 22. The DMA controller 82 provides 32 bits of memory address and 24 bits of byte count for each of seven channels. In addition, the DMA controller 82 includes a refresh controller which controls refresh cycles for the system memory. A plurality of DMA devices are coupled to the DMA controller 82 through the various channels of the DMA controller 82. In the preferred embodiment, the DMA controller 82 comprises a pair of cascaded DMA controllers compatible with the DMA controllers included in the 82357 Integrated System Peripheral (ISP) produced by Intel Corporation.

The CAC 84 of the CSP 46 provides the capability for several slave DMA and bus master controllers to share and control the EISA bus 42. The devices that may control the EISA bus 42 include one of the CPUs 20, 22 or its cache controller, 16- and 32-bit EISA bus masters, the DMA controller 82 and 16-bit ISA bus masters, and the refresh controller. The CAC 84 receives requests from the various devices to control the bus 42, synchronizes them to the bus clock, and grants control to one of the requesting devices.

There are a few other miscellaneous transfers required to inform the DSPs 47 of the occurrence of miscellaneous events within the CSP 46. The CSP 46 incorporates most of the logic previously located in a logic block referred to as an SGC which in prior systems was separate from the CSP. The SGC 86 in the CSP 46 includes the CPU restart logic and force A20 logic, and asserts corresponding RSTAR and LOWA20 signals. These signals are the same or similar in prior systems and are not described further. Any changes in these signals are transferred on the MUX bus 50.

The CSP 46 provides an interface between the MUX bus 50 and the EISA bus 42 and X bus 60 of the computer system C. Various transfers and operations are defined on the MUX bus 50 using the XST bus to define the transfer and the XAD bus to identify addresses, data, and interrupts. The CSP 46 implements a MUX bus master interface to assert interrupts and transfer data to and from the DSPs 47. The MUX bus 50 generally runs one cycle each HCLK signal period, except register read/write data portions which require three cycles. The basic state of the MUX bus 50 is I1 or interrupt 1 cycles, where certain interrupt signal status is transmitted to the DSPs 47. I1 cycles are performed unless another cycle type is needed. Other cycle types include I2 or interrupt 2; DMA; address, used in read/write operations; data; nonmaskable interrupt; and miscellaneous. In I2 cycles various other interrupt signal status besides those present in I1 cycles is transmitted.

The MUX bus interface 80 receives various interrupt request signals IRQ3-IRQ12, IRQ14 and IRQ15 from the various peripheral and I/O devices. The MUX bus interface 80 transmits corresponding interrupt request signals to the DSPs 47 via the MUX bus 50. The CSP 46 also receives a keyboard interrupt signal KBINT* and a mouse interrupt signal MSEINT* from the keyboard controller 62. When the KBINT* signal is asserted, the CSP 46 generates an interrupt request signal referred to as IRQ1 that is provided over the MUX bus 50 to the DSP 47. The CSP 46 combines the interrupt request signal IRQ12 with the MSEINT* signal through an AND gate (not shown) before providing a corresponding IRQ12 signal to the MUX bus 50. A CERR* signal asserted by one of the SDBs 44, 45 indicates a correctable memory error which is sent to the DSPs 47 via the MUX bus 50 and combined with other interrupt signals to form a shared interrupt IRQ13. I1 cycles on the MUX bus 50 provide the status of the IRQ<1>, IRQ<3...7>, DMAIRQ and CERR signals, while I2 cycles provide the status of the IRQ<8...12, 14, 15> signals. In the preferred embodiment, the MUX bus has a maximum delay between I1 or I2 cycles of five HCLK signal cycles. Thus, interrupt requests must endure for at least five HCLK signal cycles to be assured of remaining asserted long enough to propagate the interrupt over the MUX bus 50 to the interrupt controllers in the DSPs 47.

The CSP 46 also preferably latches the assertion of each of five possible system NMI interrupt conditions on the system board of the computer system C, and transfers the five NMI signals to the DSPs 47 via the MUX bus 50. These five NMI transfers include a signal which is asserted if a refresh queue counter in the CAC 84 has overflowed, an EISA bus master timeout which is asserted if an EISA timeout in the CAC 84 has occurred when an EISA bus master retains the EISA bus 42 for a certain period of time, an expansion bus cycle timeout which is asserted if either the EISA bus master timeout occurs or a timeout of a timer monitoring a CMD* signal occurs, a non-correctable memory error (NCERR*) indicated by a signal which is asserted by the SDBs 44,45, and a signal from the ISA portion of the EISA bus 42 used to indicate parity errors on memory cards plugged into the ISA bus.

Figure 3:
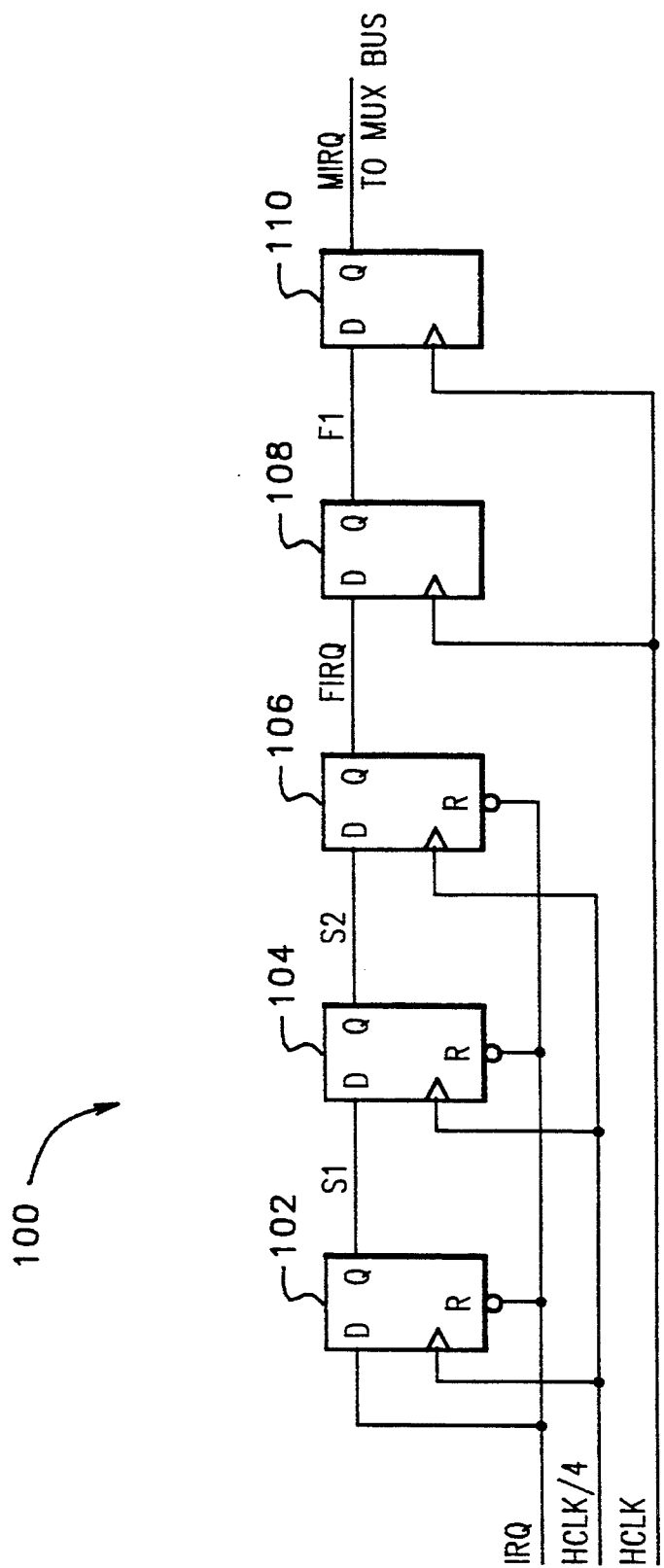
FIG. 3 is a circuit diagram of the filter of the preferred embodiment.

Each of the system interrupt inputs or IRQ signals provided to the MUX bus interface 80 is processed in the CSP 46 to distinguish noise from positive pulses and to stretch negative pulses. Referring now to FIG. 3, each system interrupt signal (IRQ) is processed by a filter 100 residing in the CSP 46 composed of five D flip-flops 102, 104, 106, 108, 110, each of which has a D-input, a clock input, a reset input, and a non-inverting output. A filter 100 is provided for each IRQ, with only one shown for simplicity. Each D flip-flop is a conventional D flip-flop so that the next state of the flip-flop following the next clock cycle is the same as the value asserted at the D-input, and is independent of the value of the present state. Thus, the flip-flop latches at its output the value asserted at its D-input when the clock provides a rising edge at the flip-flop's clock input. The clock inputs of the first three flip-flops 102, 104, 106 are connected to a host clock (HCLK) signal having its frequency reduced by a factor of 4 (HCLK/4). The HCLK signal is a clock signal for the host bus 24 and the microprocessors 20, 22, and in the preferred embodiment, operates at a frequency of either 25 MHz or 33.3 MHz. Thus, the HCLK/4 signal cycles once for every 4 cycles of the HCLK signal. Each of the flip-flops 102, 104, 106 also includes an active low, asynchronous reset input which resets the flip-flop's output to logic level low when a low signal is asserted at the input and holds it low while the logic level low signal is asserted. Each of the first three flip-flops' 102, 104, 106 reset inputs is connected to the IRQ signal, so that when the IRQ signal is logic level low, the outputs of the first three flip-flops 102, 104, 106 are also driven low for the duration of the logic level low.

The IRQ signal is also provided to the D-input of the first flip-flop 102. At the rising edge of the HCLK/4 signal after the logic level low is removed from the reset input, the logic level high IRQ signal value is latched by the first flip-flop 102, and the latched signal is asserted at the flip-flop's 102 output signal S1. The S1 signal generated by the first flip-flop 102 is provided to the D-input of the second flip-flop 104. At the rising edge of the HCLK/4 signal, the second flip-flop 104 latches the S1 signal value asserted at its D-input and asserts the latched signal at its output signal S2. The S2 signal is provided to the D-input of the third flip-flop 106. A FIRQ signal, generated by the output of the third flip-flop 106, latches the value asserted by the S2 signal at the time of the rising edge of the next HCLK/4 signal.

The other two D flip-flops 108, 110 have their clock inputs connected to the HCLK signal. The D-input of the fourth flip-flop 108 is connected to the FIRQ signal generated by the third flip-flop 106. An F1 signal generated by the fourth flip-flop 108 latches the value asserted by the FIRQ signal at the next rising edge of the HCLK signal. The F1 signal is provided to the D-input of the fifth flip-flop 110, which latches the value of the F1 signal asserted at the rising edge of the next HCLK signal and generates a MIRQ signal. The MIRQ signal is the signal that is transmitted on the MUX bus 50 corresponding to the specific system interrupt request in an I1 or I2 cycle.

The filter 100 removes short duration, positive pulses and stretches negative pulses in the IRQ signal. Any positive pulse that is maintained for fewer than 9 HCLK signal cycles is filtered out by the filter 100 and does not affect the MUX bus 50. This happens because it takes at least 9 HCLK signal cycles for the logic level high IRQ signal to be clocked through flip-flops 102, 104, 106 and be clocked into flip-flop 108. On the other hand, any negative pulse is stretched to a minimum of 9 HCLK signal cycles because this is the time it takes to propagate the logic level high back through the flip-flops 102, 104, 106, 108, 110 once the flip-flops 102, 104, 106 are cleared by the asynchronous reset. Thus positive pulses below a given minimum are filtered out and negative pulses of any width are stretched to a certain minimum.

Figure 4A:
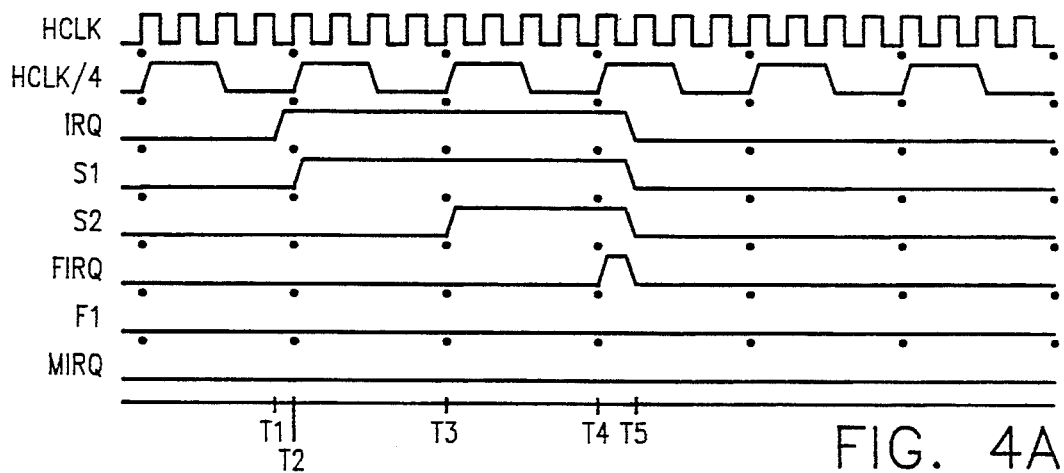
FIGS. 4A–4C are timing diagrams for the signals provided to and generated by the filter of FIG. 3.
Figure 4B:
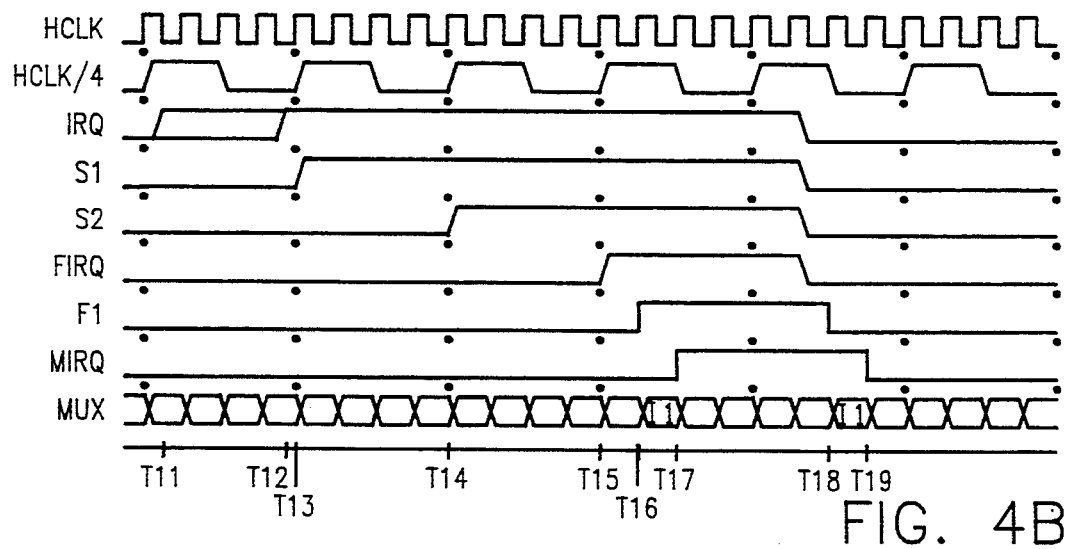
Figure 4C:
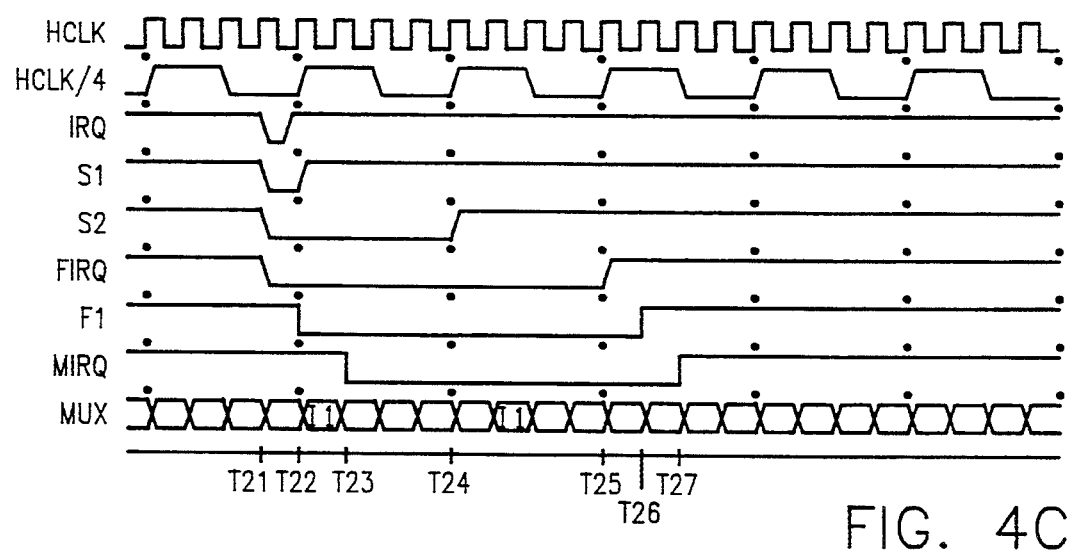

Referring now to the timing diagrams shown in FIGS. 4A–4C, the relative timing of the signals received and generated by the filter 100 is shown. In FIGS. 4A–4C, the HCLK signal operates at a particular frequency. The HCLK/4 signal operates at one quarter of the frequency of the HCLK signal. In FIG. 4A, the IRQ signal begins to assert a positive pulse at time T1. In the case of FIG. 4A, this occurs just before the rising edge of the HCLK/4 signal to present the worst case. The logic level high signal negates the reset signal to the first three flip-flops 102, 104, 106 and asserts a logic level high signal at the D-input of the first flip-flop 102. At the next rising edge of the HCLK/4 signal at time T2, the logic level high IRQ signal is latched by the first flip-flop 102 and the first flip-flop 102 output signal S1 is driven to logic level high. At time T3, one HCLK/4 signal cycle later, the IRQ signal remains at logic level high, and the logic level high S1 signal asserted at the D-input of the second flip-flop 104 is latched and the output of the second flip-flop 104 S2 is driven to logic level high. At time T4, one HCLK/4 signal cycle later, the HCLK/4 signal asserts its next rising edge and the IRQ signal remains at the logic level high. The logic level high S2 signal at the D-input of the third flip-flop 106 is latched and the output of the third flip-flop 106 FIRQ is asserted at logic level high.

Before the next rising edge of the HCLK signal at time T5, which is the ninth cycle of the HCLK signal since the IRQ positive pulse was asserted, the positive IRQ signal is negated and returns to logic level low. Because the reset input of each of the first three flip-flops 102, 104, 106 is active low, the output of each of the three flip-flops 102, 104, 106 is cleared, and the signals S1, S2 and FIRQ are driven low. Thus, at time T5 corresponding to the next rising edge of the HCLK signal, the value asserted at the D-input of the fourth flip-flop 108 is logic level low. Thus, the output of the fourth flip-flop 108 F1 and the output of the fifth flip-flop 110 MIRQ remain at logic level low, and the positive pulse of less than 9 HCLK signal cycles has been suppressed. Reviewing FIG. 4A, it is noted that the IRQ signal could have been asserted positive almost three HCLK signal cycles earlier and still been filtered out. Thus positive signals between 9 and 13 HCLK signal cycles may be filtered, but are not guaranteed to be filtered.

Because the MUX bus of the preferred embodiment has a maximum delay of 5 HCLK signal cycles between interrupt transfers of the same type, such as I1 or I2 cycles, positive pulses asserted at the MIRQ output must endure for at least 5 HCLK signal cycles to be assured of triggering the interrupt controller in the DSP 47. To assure that a positive pulse endures for at least five HCLK signal cycles, a positive pulse on the IRQ signal must be asserted for at least 17 HCLK signal cycles, based on the timing illustrated below.

For example, in FIG. 4B, a positive IRQ pulse is asserted at some time between time T11 immediately following a rising edge of the HCLK/4 signal, and time T12 immediately preceding the subsequent rising edge of the HCLK/4 signal. The positive IRQ signal is latched by the first flip-flop 102 at time T13 corresponding to the next rising edge of the HCLK/4 signal. The logic level high S1 signal generated by the first flip-flop 102 is latched by the second flip-flop 104 at time T14, which coincides with the next rising edge of the HCLK/4 signal. The logic level high S2 signal generated by the second flip-flop 104 is latched by the third flip-flop 106 at time T15 coinciding with the next rising edge of the HCLK/4 signal. At time T16, the logic level high FIRQ signal generated by the third flip-flop 106 is latched by the fourth flip-flop 108 at the next rising edge of the HCLK signal. At time T17, the next rising edge of the HCLK signal, the logic level high output F1 of the fourth flip-flop 108 is latched by the fifth flip-flop 110, which generates a logic level high output MIRQ which is provided to the MUX bus 50 at time T17.

The positive pulse on the IRQ signal is negated prior to time T18, which is 3 HCLK signal cycles from time T17, and the first three flip-flops 102, 104, 106 are cleared so that the S1, S2, and FIRQ signals return to logic level low. At time T18, which corresponds to the next rising edge of the HCLK signal following the negation of the IRQ positive pulse, the low FIRQ signal generated by the third flip-flop 106 is latched by the fourth flip-flop 108 and its output signal F1 is driven low. At time T19, which corresponds to the next rising edge of the HCLK signal, the low output F1 of the fourth flip-flop 108 is latched by the fifth flip-flop 110, which drives the MIRQ signal generated by the fifth flip-flop 110 low.

The positive MIRQ pulse in FIG. 4B remains high for 5 HCLK signals. As indicated previously, the maximum time between interrupts of the same type on the MUX bus 50 is 5 cycles of the HCLK signal. Thus, if an interrupt is requested immediately prior to time T17 corresponding to assertion of the MIRQ signal, the MIRQ positive pulse must be maintained for at least 5 HCLK signal cycles to be assured of providing the interrupt request to the MUX bus 50. Thus, the positive pulse period required to guarantee the transmission of interrupt signal over the MUX bus 50 is 3 HCLK periods after the MIRQ signal is developed and 14 HCLK periods to insure development of the MIRQ signal. If the positive pulse continues, the length of the MIRQ signal merely extends in like measure.

The result of positive pulses between 10 and 16 HCLK signal cycles cannot be stated with certainty. As noted, based on the appearance of the IRQ rising edge versus the HCLK/4 signal rising edge, positive pulses up to 13 HCLK cycles may be filtered. However, positive pulses of 10 HCLK cycles may also result in transmission of the pulse if the IRQ rising edge is as in FIG. 4A, the MUX bus 50 is transmitting back to back I1 cycles and the IRQ is in the I1 group. Alternatively, a 16 HCLK cycle positive pulse would not be registered, as apparent if the pulse of FIG. 4B were terminated one HCLK signal earlier. Thus the status of the positive pulses between 10 and 16 HCLK signal cycle in length is unclear. But this is not considered a problem because for known peripheral devices which utilize positive pulses, all the pulses remain for a period in excess of 17 HCLK cycles, normally hundreds or thousands of cycles, until cleared by the interrupt service routine. And the filtering of all positive pulses below 9 HCLK cycles, and not a greater number, is adequate as the vast majority of noise-induced pulses are of a shorter duration. Therefore the area of uncertainty is acceptable because no critical cases are known to be present and yet the noise-triggered cases are greatly reduced without even more extreme filtering.

The uncertainty in the complete filtering of the positive pulses arises in part from the use of the HCLK/4 signal to clock the flip-flops 102, 104 and 106. If desired, it is understood that a plurality of flip-flops, all clocked by the HCLK signal, could replace the flip-flops 102, 104 and 106. For example, if a strict 9 HCLK signal filtering is desired, flip-flops 102 and 104 could be replaced by four similarly cascaded flip-flops, each having their reset inputs connected to the IRQ signal, the final flip-flop driving flip-flop 106, and each being clocked by the HCLK signal. Thus the ambiguity as to the timing with relationship to the HCLK/4 signal is removed. This change would also have the effect of the tightening up the minimum negative pulse width case output. In this design a minimum positive pulse width of only 14 HCLK signal cycles, rather than 17 HCLK cycles, would be necessary to guarantee transmission to the interrupt controller in the DSP 47. However, this design is not preferred as it requires more gates and the timings are not critical, as noted above.

Further, it is understood that the various times could change by changing the number of flip-flops in the string, the various clocking signal ratios and the proportion of the slow and fast clock rate flip-flops. Such variations are included in the present invention.

In addition to filtering positive IRQ pulses, any negative IRQ pulse causes a negative pulse on the MIRQ output of at least 9 HCLK signal cycles. Stretching a negative pulse ensures that the short duration pulse in normally high IRQ signals is detected. Negative pulses are detected and stretched regardless of the timing or duration of the pulse. The negative signal asserted at the MIRQ output endures for at least 9 HCLKs.

An example is illustrated in FIG. 4C, in which the signal asserted at the IRQ input of the CSP 46 is a normally logic level high signal asserted by a negative pulse. At time T21, the IRQ signal is asserted logic level low, but the IRQ signal is negated to logic level high prior to time T22 corresponding to the rising edge of the HCLK/4 signal. In fact, the negative pulse is less than one HCLK cycle in length. At time T21, the negative pulse of the IRQ signal activates the reset input of each of the first three flip-flops 102, 104, 106, causing the S1, S2 and FIRQ signals to be driven low. At time T22 corresponding to the next rising edge of the HCLK/4 signal, the logic level high IRQ signal is latched by the first flip-flop 102 and the output of the first flip-flop 102 S1 signal is driven high. At the same time, the logic level low FIRQ signal is latched by the fourth flip-flop 108 and the output signal F1 of the fourth flip-flop 108 is driven to logic level low. At time T23, coinciding with the next rising edge of the HCLK signal, the logic level low output signal F1 is latched by the fifth flip-flop 110 and the MIRQ output signal is driven to logic level low. At time T24, corresponding to the next rising edge of the HCLK/4 signal, the logic level high S1 signal is latched by the second flip-flop 104 and the S2 output signal of the second flip-flop 104 is high. At the following rising edge of the HCLK/4 signal designated T25, the logic level high S2 signal is latched by the third flip-flop 106 and the output signal FIRQ is driven to logic level high. At time T26, corresponding to the next rising edge of the HCLK signal, the logic level high output signal FIRQ is latched by the fourth flip-flop 108 which drives the output of the fourth flip-flop 108 F1 to logic level high. Finally, at time T27, corresponding to the next rising edge of the HCLK signal, the logic level high output signal F1 is latched by the fifth flip-flop 110 and the MIRQ output signal is driven to logic level high. Thus, even in this worst case, the MIRQ signal has been negative or low for at least 9 HCLK cycles. Extending the length of the negative pulse would increase the length of time the MIRQ signal is low.

Like the positive IRQ pulse, the negative pulse must be maintained for 5 HCLK cycles to guarantee that the interrupt signal is transferred to the MUX bus 50. If an interrupt is asserted on the MUX bus 50 immediately preceding time T23, another interrupt may not be asserted for five cycles of the HCLK signal. Any negative pulse generated at the IRQ input of the CSP 46, however, is stretched by the filter circuit so that the negative pulse lasts for at least 9 cycles of the HCLK signal. When the IRQ signal pulses momentarily low, the first flip-flop 102 output may be driven low for no more than an instant. At least 4 HCLK cycles must occur before the logic level high output of the first flip-flop 102 is latched by the second flip-flop 104, and 4 more HCLK cycles must pass before the logic level high signal is provided to the third flip-flop 106. One HCLK cycle later, the logic level high signal is latched by the fourth flip-flop 108. Finally, on the tenth HCLK cycle after the negative IRQ pulse occurred, the fifth flip-flop 110 latches the logic level high and drives the MIRQ signal high.

Thus, any negative pulse in the IRQ signal sufficient to reset the first three flip-flops 102, 104, 106 is stretched for at least 9 HCLK signal cycles. Nine HCLK cycles is sufficient to assure that the interrupt is asserted on the MUX bus. In addition, the same filter 100 suppresses positive pulses lasting fewer than 9 HCLK cycles, which effectively eliminates noise from the interrupt request signal. As a result, needless interrupts caused by noise in the interrupt request signals are minimized.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:
   an interrupt controller for receiving interrupt request signals;
   an interrupting device which provides an interrupt request signal when service of said interrupting device is necessary, said interrupt request signal being of a positive or negative pulse format; and
   filter means having an input and an output, said filter means input receiving said interrupt request signal from said interrupting device and said filter means output providing a signal to said interrupt controller, said filter means filtering out positive pulse interrupt request signals below a first predetermined length, passing positive pulse interrupt request signals greater than a second predetermined length which exceeds said first predetermined length and providing an output signal of a predetermined minimum length to said interrupt controller on the receipt of a negative pulse interrupt request signal.

2. The computer system of claim 1, further comprising:
   a clock signal; and
   wherein said filter means includes a plurality of flip-flops clocked by said clock signal.

3. The computer system of claim 2, wherein said filter means further includes means for dividing said clock signal and wherein some of said plurality of flip-flops receive said divided clock signal and the remaining of said plurality of flip-flops receive the undivided clock signal.

4. The computer system of claim 3, wherein said flip-flops receiving said divided clock signal include inverted reset inputs and said received interrupt request signal is connected to said inverted reset inputs.

5. The computer system of claim 4, wherein said plurality of flip-flops are arranged in cascading order, said flip-flops receiving said divided clock signal preceding said flip-flops receiving said undivided clock signal, wherein said received interrupt request signal is provided to the data input of the first of said flip-flops and the data output of the last of said flip-flops is the output signal of said filter means.

6. The computer system of claim 5, wherein said flip-flops are D-type flip-flops.

* * * * *